(12) United States Patent
Nystad

(10) Patent No.: US 9,772,864 B2
(45) Date of Patent: Sep. 26, 2017

(54) METHODS OF AND APPARATUS FOR MULTIDIMENSIONAL INDEXING IN MICROPROCESSOR SYSTEMS

(71) Applicant: ARM Limited, Cambridge (GB)

(72) Inventor: Jorn Nystad, Trondheim (NO)

(73) Assignee: ARM LIMITED, Cambridge (GB)

( * ) Notice: Subject to any disclaimer, the term of this patent is extended or adjusted under 35 U.S.C. 154(b) by 748 days.

(21) Appl. No.: 13/863,599

(22) Filed: Apr. 16, 2013

(65) Prior Publication Data

US 2014/0310507 A1    Oct. 16, 2014

(51) Int. Cl.
*G06F 9/445* (2006.01)

(52) U.S. Cl.
CPC ................ *G06F 9/44521* (2013.01)

(58) Field of Classification Search
CPC .................................................. G06F 9/44521
USPC .......................................................... 717/149
See application file for complete search history.

(56) References Cited

U.S. PATENT DOCUMENTS

| | | | |
|---|---|---|---|
| 7,430,560 B1 | 9/2008 | Mittal | |
| 7,584,342 B1 * | 9/2009 | Nordquist | G06F 9/3851 712/22 |
| 2002/0002549 A1 | 1/2002 | Lunteren | |
| 2008/0033989 A1 | 2/2008 | Cha et al. | |
| 2008/0114793 A1 | 5/2008 | Grosset et al. | |
| 2008/0184211 A1 * | 7/2008 | Nickolls | G06F 8/456 717/140 |
| 2013/0044924 A1 * | 2/2013 | Spencer | G06K 9/6282 382/128 |

OTHER PUBLICATIONS

Combined Search and Examination Report dated Nov. 7, 2014, in GB Patent Application No. GB1406835.7, 7 pages.

* cited by examiner

*Primary Examiner* — Li B Zhen
*Assistant Examiner* — Daniel Wei
(74) *Attorney, Agent, or Firm* — Vierra Magen Marcus LLP

(57) ABSTRACT

When an OpenCL kernel is to be executed, a bitfield index representation to be used for the indices of the kernel invocations is determined based on the number of bits needed to represent the maximum value that will be needed for each index dimension for the kernel. A bitfield placement data structure 33 describing how the bitfield index representation is partitioned is then prepared together with a maximum value data structure 32 indicating the maximum index dimension values to be used for the kernel. A processor then executes the kernel invocations 36 across the index space indicated by the maximum value data structure 32. A bitfield index representation 35, 37, 38 configured in accordance with the bitfield placement data structure 33 is associated with each kernel invocation to indicate its index.

15 Claims, 2 Drawing Sheets

METHODS OF AND APPARATUS FOR MULTIDIMENSIONAL INDEXING IN MICROPROCESSOR SYSTEMS

BACKGROUND

The technology described herein relates to a multidimensional mechanism for use in microprocessor systems, and in particular to a multi-dimensional kernel invocation indexing mechanism for a system that executes large numbers of compute kernels, for example where such kernels are executed under compute-shader APIs, like OpenCL and DirectCompute.

As is known in the art, OpenCL (Open Computing Language) is a standardised framework for writing programs that execute across heterogeneous platforms consisting of CPUs (Central Processing Units), GPUs (Graphics Processing Units) and/or other processors. It includes a language for writing "kernels" (programs for executing given functions), and APIs (Application Programming Interfaces) that are used to define and then control the platforms that the kernels are to be executed on. A typical use of OpenCL is to use a graphics processing unit (a graphics processor) for highly parallel data processing operations, such as image processing (e.g. filtering), texture or other data array compression, iteratively solving differential equations, etc.

Under the OpenCL API, a "kernel" is a (usually small) program that is invoked a large number of times. A typical use of kernels is to perform a large computation in parallel, where each invocation of a kernel performs only a small part of the computation (for example for a given region of an image to be processed or of a texture to be compressed). The kernel invocations are taken to run in parallel, and except for certain restrictions (which will be discussed further below), there is no execution order constraints between them. With such an arrangement, each kernel invocation needs to be able to be identified, in order to allow different invocations of the same kernel to work on different parts of the overall computation. For example, each kernel invocation must know which particular part of the data set (e.g. image) in question it is to process. This is usually done by indexing the kernel invocations, using an appropriate kernel invocation ID or index (which index can then be used to, e.g., identify the data set for the invocation in question, etc.). The index may, e.g., be interpreted by the kernel to identify one specific image pixel location to process, or a row of a video buffer to de-interlace, etc.

In the OpenCL API, each kernel invocation has invocation ID (identifier), which is composed of two major parts: a so-called "work-group" ID and a "work-item" ID. The "work group" is a mechanism used in OpenCL to organise kernel invocations into defined groups. The distinguishing feature of a work-group is that all the kernel invocations within a given work-group are able to participate in a "barrier". (As is known in the art, a "barrier" is a parallel-computing construct where all the kernel invocations to which the barrier applies are required to reach a particular step in their execution before any of them are permitted to continue from that step.) All the kernel invocations within a single work-group have the same work-group ID. Each kernel invocation within a given work-group has a unique work-item ID within the work-group (such that the work-group ID and work-item ID together uniquely identify the kernel invocation in question).

The work-group ID and work-item ID in OpenCL each consist of a tuple of 3 integers. These tuples thus define a 6-dimensional index space. When a kernel is specified for execution, it will also have defined for it the dimensions of its index space, i.e. the maximum value each dimension of the kernel invocation IDs can have for the kernel in question. The processor executing the kernel then executes one kernel invocation for each point within the index space specified for the kernel.

The size of the work-group integers defining the work-group ID is limited in OpenCL to 32 bits.

The size of integers defining the work-item ID is determined by the maximum permitted work-group size, which may, e.g., be 1024 work-items in any one work group. Each integer defining the work-item ID must be able to represent the total number of possible work-items in a work-group, as it will not be known how the work-items are distributed across the three dimensions of the work-item ID (they could, e.g., all lie along one dimension only). Thus, where a work-group can contain up to 1024 work items, each work-item integer will require 10 bits.

Thus, representing a full OpenCL kernel invocation ID in this manner would require:

3*32=96 bits for the work-group ID
and 3*10=30 bits for the work-item ID (where each work-group can contain up to 1024 work-items), which sums to 126 bits. FIG. 1 illustrates this and shows the fields required to denote an OpenCL kernel invocation ID in this manner.

When using kernel invocations, this 126-bit ID needs to be associated with, and tracked for, each kernel invocation. It can therefore represent a fairly significant overhead for the process.

It is known to try to reduce the cost of kernel invocation ID use in graphics processors by using an execution-unit approach that groups kernel invocations together into groups of 16 to 64 kernel invocations that then run in strict lockstep. This amortizes the cost of the invocation indexing across the group of "lockstepped" invocations. However, this technique cannot be used for kernels that feature divergent branching (as the invocations in the lockstepped group must be locked together).

It is also known in CPU systems to have each execution thread sequentially execute one kernel invocation after another. In this case, only one full kernel invocation index usually needs to be maintained in each thread, as this index can usually be updated with simple additions when the execution thread proceeds from one invocation to the next. However, while this is possible in CPU systems that may typically have only 4 threads per processing core, the cost of this technique becomes very high when the possible number of execution threads in the processing core becomes large (which is typically the case for graphics processors, where, for example, there may be 1024 threads per processing core).

The Applicants believe therefore that there remains scope for improved techniques for handling multidimensional indices, such as kernel invocation indexes, particularly where such kernels are being used with graphics processors and compute engines.

BRIEF DESCRIPTION OF THE DRAWINGS

A number of embodiments of the technology described herein will now be described by way of example only and with reference to the accompanying drawings, in which.

DETAILED DESCRIPTION

Figure 1:
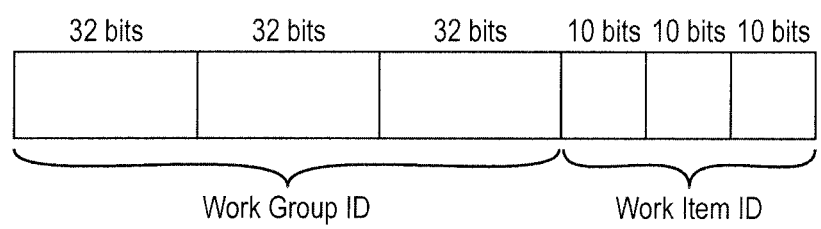
FIG. 1 shows the fields required to denote an OpenCL kernel invocation ID in the manner of the prior art.

A first embodiment of the technology described herein comprises a method of processing kernel invocations in a system where a kernel to be executed has defined for it a set of plural index dimensions over which separate invocations of the kernel are to be executed, the method comprising:

for a kernel to be executed having a defined set of index dimensions:
determining the number of bits needed to represent a maximum value to be indicated for each dimension of the kernel's index;
determining a bitfield index representation to be used for indicating the indices for invocations of the kernel based on the determined number of bits needed to represent the maximum value to be indicated for each dimension of the kernel's index;
preparing a bit field placement data structure for the kernel, indicating the placement of the bits representing each dimension of the kernel's index within the determined bitfield index representation to be used for indicating the indices for invocations of the kernel;
providing the bitfield placement data structure to a processor or processors that are to execute the kernel; and
when a kernel invocation is to be executed, associating with the kernel invocation a bitfield index representation configured in accordance with the bitfield placements indicated by the bitfield placement data structure and indicating in the respective bit positions indicated by the bitfield placement data structure, a value for the respective index dimension for the kernel invocation, so as to indicate a kernel invocation index for the kernel invocation.

A second embodiment of the technology described herein comprises a system for processing kernel invocations, in which a kernel to be executed has defined for it a set of plural index dimensions over which separate invocations of the kernel are to be executed, the system comprising:

one or more processors configured to, for a kernel to be executed having a defined set of index dimensions:
determine the number of bits needed to represent a maximum value to be indicated for each dimension of the kernel's index;
determine a bitfield index representation to be used for indicating the indices for invocations of the kernel based on the determined number of bits needed to represent the maximum value to be indicated for each dimension of the kernel's index;
prepare a bit field placement data structure for the kernel, indicating the placement of the bits representing each dimension of the kernel's index within the determined bitfield index representation to be used for indicating the indices for invocations of the kernel; and to
provide the bitfield placement data structure to a processor or processors that are to execute the kernel;

the system further comprising:
one or more processors configured to:
execute the kernel; and to:
when a kernel invocation is to be executed, associate with the kernel invocation a bitfield index representation configured in accordance with the bitfield placements indicated by the bitfield placement data structure and indicating in the respective bit positions indicated by the bitfield placement data structure, a value for the respective index dimension for the kernel invocation, so as to indicate a kernel invocation index for the kernel invocation.

In the technology described herein, when a kernel is to be executed, the maximum number of bits that will be needed to represent each different dimension of the kernel's ID are first determined, and a bitfield index representation data structure to be used to represent the index for each invocation of the kernel is determined based on the determined maximum number of bits needed to represent each dimension of the kernel's ID. In other words, the index for each kernel invocation is packed into a data structure that is based on the determined maximum number of bits needed to represent each dimension of the kernel's ID.

This then has the effect, as will be discussed further below, of representing the kernel invocation indices more efficiently, than, e.g., using sufficient bits to represent the theoretical maximum value that a given kernel ID could have in any given dimension. By determining the actual maximum number of bits needed to represent each dimension of the index, the unnecessary provision of bits for representing the index for each kernel invocation can be avoided.

Thus, a third embodiment of the technology described herein comprises a method of representing the index of a kernel invocation in a system where a kernel to be executed has defined for it a set of plural index dimensions over which separate invocations of the kernel are to be executed, the method comprising:

for a kernel to be executed having a defined set of index dimensions:
determining, for each dimension of the kernel's index, a maximum number of bits that will be needed to represent that dimension of the kernel's index; and
packing the index for each kernel invocation to be executed into a data structure that is based on the determined maximum number of bits needed to represent each index dimension defined for the kernel.

A fourth embodiment of the technology described herein comprises a system for representing the index of a kernel invocation in a system where a kernel to be executed has defined for it a set of plural index dimensions over which separate invocations of the kernel are to be executed, the system comprising:

one or more processors configured to, for a kernel to be executed having a defined set of index dimensions:
determine, for each dimension of the kernel's index, a maximum number of bits that will be needed to represent that dimension of the kernel's index; and
pack the index for each kernel invocation to be executed into a data structure that is based on the determined maximum number of bits needed to represent each index dimension defined for the kernel.

Although the technology described herein does require additional processing in terms of determining the number of bits needed to represent each dimension of a given kernel and the bitfield placement for the bitfield index representation, the Applicants believe this will be outweighed by the potential savings achieved by representing the individual kernel invocation IDs more efficiently.

The technology described herein thus, inter alia, provides a mechanism for providing the kernel invocation IDs at a lower cost. Moreover, in contrast with prior art techniques, the technology described herein can be used with kernels that feature divergent branching (it supports divergent flow control) and for large numbers of threads, while still providing a more efficient and less costly mechanism for handling the kernel invocation IDs.

In some embodiments the system and/or apparatus comprises, and/or the processor or processors may be in communication with, one or more memories or memory devices that store the bitfield placement data structure for the kernel and/or store a bitfield index representation for the or each kernel invocation being executed and/or store software code for executing the kernel and/or store the data described herein and/or store the data structures described herein and/or store software for performing the processes described herein. The system, apparatus, and/or processor or processors may also be in communication with, or comprise a part of, a host CPU and/or a graphics processor for processing the data described herein and/or for performing the processes described herein.

The technology described herein also extends to the determination of the bitfield index representation per se, and, correspondingly, to the use of the bitfield index representation for indicating the index of a kernel invocation.

Thus, a fifth embodiment of the technology described herein comprises a method of operating a processing system in which kernels to be executed have defined for them a set of plural index dimensions over which separate invocations of the kernel are to be executed, the method comprising:

for a kernel to be executed having a defined set of index dimensions:
determining, for each dimension of the kernel's index, a maximum number of bits that will be needed to represent that dimension of the kernel's index;
determining a bitfield index representation to be used for indicating the indices for invocations of the kernel based on the determined maximum number of bits needed to represent each dimension of the kernel's index; and
preparing a bit field placement data structure for the kernel, indicating the placement of the bits representing each dimension of the kernel's index within the determined bitfield index representation to be used for indicating the indices for invocations of the kernel.

A sixth embodiment of the technology described herein comprises an apparatus for use in a system in which kernels to be executed have defined for them a set of plural index dimensions over which separate invocations of the kernel are to be executed, the apparatus comprising:

one or more processors configured to, for a kernel to be executed having a defined set of index dimensions:
determine, for each dimension of the kernel's index, a maximum number of bits that will be needed to represent that dimension of the kernel's index;
determine a bitfield index representation to be used for indicating the indices for invocations of the kernel based on the determined maximum number of bits needed to represent each dimension of the kernel's index; and
prepare a bit field placement data structure for the kernel, indicating the placement of the bits representing each dimension of the kernel's index within the determined bitfield index representation to be used for indicating the indices for invocations of the kernel.

A seventh embodiment of the technology described herein comprises a method of indexing kernel invocations that are being executed in a system where a kernel to be executed has defined for it a set of plural index dimensions over which separate invocations of the kernel are to be executed, the method comprising:

for a kernel to be executed having a defined set of index dimensions:
reading a bit field placement data structure for the kernel, indicating the placement of the bits representing each dimension of the kernel's index within a bitfield index representation to be used for indicating the indices for invocations of the kernel; and
when an invocation of the kernel is to be executed, associating with the kernel invocation a bitfield index representation indicating in the respective bit positions indicated by the bit field placement data structure for the kernel, a value for the respective index dimension for the kernel invocation, so as to indicate the index for the kernel invocation.

An eighth embodiment of the technology described herein comprises a processor for executing kernel invocations in a system where a kernel to be executed has defined for it a set of plural index dimensions over which separate invocations of the kernel are to be executed, the processor configured to:

read a bit field placement data structure for a kernel to be executed having a defined set of index dimensions, the bitfield placement data structure indicating the placement of the bits representing each dimension of the kernel's index within a bitfield index representation to be used for indicating the indices for invocations of the kernel; and configured to:
when an invocation of the kernel is to be executed, associate with the kernel invocation a bitfield index representation indicating in the respective bit positions indicated by the bit field placement data structure for the kernel, a value for the respective index dimension for the kernel invocation, so as to indicate the index for the kernel invocation.

In some embodiments the system and/or apparatus comprises, and/or the processor or processors may be in communication with, one or more memories or memory devices that store the bitfield placement data structure for the kernel and/or store a bitfield index representation for the or each kernel invocation being executed and/or store software code for executing the kernel and/or store the data described herein and/or store the data structures described herein and/or store software for performing the processes described herein. The system, apparatus, and/or processor or processors may also be in communication with, or comprise a part of, a host CPU and/or a graphics processor for processing the data described herein and/or for performing the processes described herein.

The bitfield index representation can be configured to represent the invocation indices in any desired and suitable manner based on the determined number of bits needed to represent each dimension of the kernel's ID.

In an embodiment the bitfield index representation includes separate fields for one or more or some, in an embodiment for plural, and in an embodiment for each, of the different index dimensions that are to be represented.

The number of bits in each index dimension field is in an embodiment based, at least in part, on the number of bits needed to represent a maximum value to be used for the index dimension in question. This maximum value could, e.g., be the maximum value that is defined or specified for the index dimension in question, or, as will be discussed further below, it could be the maximum value that will need to be indicated once an offset has been subtracted from the original (the "true") maximum value for the index dimension in question. Similarly, the maximum number of bits that will be needed to represent a dimension of the kernel's index is in an embodiment based on a maximum value to be used for the index dimension in question, which maximum value is again in an embodiment either the maximum value that is defined or specified for the index dimension in question, or a maximum value that will need to be indicated once an offset has been subtracted from the original (the "true") maximum value for the index dimension in question.

In an embodiment some (more than one) of the index dimension fields in the bit field index representation have a size (number of bits) equal to the number of bits needed to represent the maximum value to be indicated for the index dimension in question. In one embodiment this is the case for all the index dimension fields, but in other embodiments (as will be discussed further below) it is the case for some but not all (e.g. for all but one) of the index dimension fields.

In an embodiment the bitfield index representation is configured such that the index space dimensions are represented in predetermined order within the bitfield, in an embodiment from the lowest dimension to the highest, in an embodiment from right to left (bit 0 to the highest bit) in the bitfield. (In the case of OpenCL, the lowest three index dimension fields will therefore indicate the work item ID, and the highest three index dimension fields will indicate the work group ID.)

In an embodiment, if a dimension specified for the index space of the kernel has a single, constant value (rather than a range of values), rather than setting aside bits in the bitfield representation to indicate that value, it is not recorded in the bitfield representation (i.e. no bits in the bitfield representation are allocated to that index dimension) and instead its value as indicated by the bitfield representation is assumed to be one when interpreting the bitfield to derive an invocation index.

It would be possible always to use the actual number of bits determined to be needed for the bitfield index representation for each kernel (i.e. that are needed to represent the maximum value for each dimension of the kernel index space). In this case the bitfield representation would comprise the total number of bits determined to be necessary to represent the maximum value of each dimension of the kernel's index.

However, in an embodiment, a predetermined number of bits, such as, and in an embodiment 32 bits, is set aside for the bitfield index representation (i.e. the bitfield index representation that is used comprises a predetermined number of bits (for each kernel), irrespective of the actual size of the index space for a given kernel). This has the advantage that a known number of bits will be used for the bitfield index representation used in the technology described herein, rather than the number of bits potentially varying as between index representations for different kernels.

In this arrangement, where the index space for a kernel does not require all of the predetermined number of bits for the bitfield representation, any unneeded bits may, e.g., and in an embodiment, be assigned to the field of one of the index dimensions (such as, and in an embodiment, the top dimension) and set to zero.

The bitfield placement data structure can indicate the bitfield positions of the different dimensions in the bitfield index representation in any desired manner. In one embodiment, the bitfield placement data structure indicates the starting bits for the fields for the index dimensions within the bitfield index representation, in an embodiment starting at bit 0 in the bitfield index representation, and working from the lowest dimension to the highest. In another embodiment, the bitfield placement data structure indicates the number of bits being used for each dimension of the kernel's index in the bitfield index representation, again in an embodiment starting at bit 0 in the bitfield index representation, and working from the lowest dimension to the highest.

The bitfield placement data structure can be provided to the processor(s) that is to execute the kernel in any desired and suitable manner. For example, it may be stored in a memory, register, etc., from where it can be read by the processor(s) in question, or it may be sent to the processor(s) in question, etc. Thus, in an embodiment, the method and system of the technology described herein comprise steps of or a processor(s) configured to prepare and store a bit field placement data structure for the kernel, indicating the placement of the bits representing each dimension of the kernel's index within the determined bitfield index representation to be used for indicating the indices for invocations of the kernel.

In an embodiment, as well as generating the bitfield placement data structure that is provided to the processor(s) that is to execute the kernel, a kernel index maximum dimension value data structure, indicating for each dimension of the kernel's index, a maximum value for that dimension to be used for the invocations of the kernel, is also generated and provided to the processor(s) that is to execute the kernel. This will then efficiently indicate to the processor(s) that is to execute the kernel, the size of the work group over which the kernel is to be executed and thus the number of kernel invocations to initiate (i.e. the size of the index space over which kernel invocations are to be executed). This kernel index maximum value data structure is in an embodiment stored in a data structure having the configuration indicated by the bitfield placement data structure for provision to the processor or processors that are to execute the kernel.

Thus, in an embodiment, the methods of the technology described herein further comprise steps of:
preparing and storing in a data structure having the configuration indicated by the bitfield placement data structure, a kernel index maximum dimension value data structure indicating for each dimension of the kernel's index, a maximum value to be used for that dimension for the invocations of the kernel; and
providing the kernel index maximum value data structure to a processor or processors that are to execute the kernel.

Similarly, in an embodiment, the system and processor(s) of the technology described herein are further configured to:
prepare and store in a data structure having the configuration indicated by the bitfield placement data structure, a kernel index maximum dimension value data structure indicating for each dimension of the kernel's index, a maximum value to be used for that dimension for the invocations of the kernel; and
provide the kernel index maximum value data structure to a processor or processors that are to execute the kernel.

The determination of the number of bits required to represent each dimension of the kernel's ID, and the generation of the bitfield placement structure and the maximum dimension value data structure (if provided) may be carried out as desired. In an embodiment, the driver on the host CPU (processor) that generates the instruction to execute the kernel to be sent to the processor that is to execute the kernel does this.

The bitfield placement and maximum dimension value data structures, together with the instruction to execute the kernel, are in an embodiment then provided to the processor that is to execute the kernel or to the processors that are to execute the kernel (e.g. in a multi-core system). The processor(s) in an embodiment then generates and executes the necessary kernel invocations, and associates with each invocation an index in the form of the bitfield index representation of the technology described herein.

Each processor that executes the kernels may be any suitable such processor. It is in an embodiment a graphics processor, but could also, e.g., be a compute engine.

The, e.g., graphics, processor(s) that is to execute the kernel can generate and execute the kernel invocations required for the kernel as desired. In an embodiment, this is done by iterating over the index space indicated by the maximum dimension value data structure, producing and executing one kernel invocation for each point within the index space defined by maximum dimension value data structure.

The processor(s) may and in an embodiment does use the information in the bitfield placement data structure to interpret the maximum dimension value data structure (i.e. to determine which bits in the maximum dimension value data structure indicate the value of which dimension of the ID).

The processor(s), e.g., graphics processor(s), that is executing the kernel in an embodiment generates the index for each kernel invocation as it starts each invocation. It will use the information in the bitfield placement data structure to pack the index for each invocation into the bitfield index representation data structure indicated by the bitfield placement data structure.

Each so-packed index (ID) should, as is known in the art, be associated with the invocation in question and used, e.g., to identify which set of data the kernel invocation in question should process and where it should store or otherwise output its results. The indices may, e.g., be stored suitably in memory for this purpose.

When the index for an invocation needs to be used, the packed index generated for (associated with) the invocation will be read, and then the information in the bitfield placement data structure used to interpret the packed index (i.e. which bits indicate the value of which dimension of the index), so as to determine the index for the invocation. Thus, in an embodiment, the technology described herein further comprises uses the bitfield placement data structure to interpret the packed index bitfield representation for a kernel invocation.

While it would be possible to associate with each invocation its "full" packed index (i.e. to have a separate, complete representation of the bitfield packed index for each invocation), and this would still provide a more efficient mechanism for representing the kernel invocation indices, the Applicants have further recognised that where kernel invocations may be grouped together into defined groups for processing (such as is the case with work groups for OpenCL), then the index representation technique of the technology described herein can be used even more efficiently.

In particular where, as is the case in OpenCL, kernel invocations can be grouped into groups (work groups in OpenCL) of a defined maximum number of invocations (work items in OpenCL), and these elements are indicated by different dimensions in the kernel index space, then some of the index dimensions will retain the same values for all the invocations (e.g. work items) within a given group of invocations (e.g. within a given work group). This, in effect, means that some of the index dimensions will vary in value on a per-invocation (per-work item) basis, whereas other index dimensions' values will only vary on a per-invocation group (per-work group) basis.

The Applicants have recognised that in this case, it is then possible to use (and, e.g., store) the per-invocation group dimension values in common for all the invocations of the group, such that only the dimensions that vary on a per-invocation basis need be stored on a per-invocation basis. This can provide a further saving, as a more limited amount of the index data is used (and, e.g., stored) on a per-invocation basis.

Thus, in an embodiment, the bitfield index representation for a given kernel invocation is handled and used (and, e.g., stored) in two parts, a first part that is specific to the kernel invocation in question, and a second part that is shared by (used in common for) a group of kernel invocations. In an embodiment the second part is stored only once for the group of kernel invocations that it relates to. Then, when the index for a given kernel invocation is required, the two parts of the index representation are in an embodiment concatenated together to give the full bitfield index representation (each part, and the concatenated parts may be, and are in an embodiment, interpreted using the information in the bitfield placement data structure to determine the invocation index, as discussed above).

In this arrangement, the invocation index for a kernel invocation is, in effect, broken down in a manner that then enables the correct index to be retrieved whilst only having to track a more limited amount of information (rather than the full kernel invocation index) on a per-invocation basis.

As discussed above, the first, per-invocation (invocation specific) part of the index representation in an embodiment represents the index dimensions that will vary on a per-invocation basis (in OpenCL, the dimensions that will indicate the work item ID), whereas the second, shared part of the index representation represents those dimensions of the index that will vary on an invocation group basis (in OpenCL, the dimensions that indicate the work group ID).

It would be possible to determine on a kernel-by-kernel basis exactly which bits of the index representation are needed to represent the per-invocation dimensions and to then associate those bits only with each invocation. However, the Applicants have recognised that in general a conservative estimation of the number of bits that will be needed to represent the index dimensions that vary on a per-invocation basis can be determined, and then this number of bits of each bitfield index representation associated with each invocation, without the need to determine exactly how many bits are needed for the per-invocation dimensions each time.

For example, where the maximum number of invocations that a given group of invocations (e.g. work group) can contain is set to $2^P$ (which will typically be the case), the maximum possible number of bits that could ever be needed to represent this number of invocations, irrespective of how they are distributed across the index dimensions, can be determined, and then this number of bits set aside to be associated with each individual invocation.

Thus, the maximum number of bits needed to represent any per-invocation index dimension configuration given the maximum permitted number of invocations a group of invocations can contain is in an embodiment determined, and then this number of bits is set as the number of bits that are stored on per-invocation basis.

For example, in OpenCL where a work group can contain $2^P$ work items and three dimensions can be used to denote the work item index, the Applicants have found that no more than P+2 bits should be needed to represent the three work item ID dimensions in the system of the technology described herein, irrespective of how the $2^P$ work items are distributed across the three work item dimensions. (For example, if there is a maximum of 1024 ($2^{10}$) work items in an OpenCL work group, if the work items are all distributed along one index dimension, that would require 10 bits to represent; if they are distributed as equally as possible along each index dimension (i.e.≈index values 1-10 along each dimension (as 10×10×10 =1000)), then each dimension will need 4 bits to represent the possible index values in that dimension, giving a total of 12 bits for representing all the work item IDs.)

Thus, in an embodiment, a predetermined number of the bits in the packed bitfield representation of the indices is associated with each invocation (stored on a per-invocation basis), with the remaining bits of the bitfield index representation being associated with a group of kernel invocations (stored on a per-invocation group (e.g. work group) basis). The predetermined number of bits is in an embodiment based on the maximum number of invocations allowed for a given group of invocations, and is in an embodiment P+2 bits where the maximum invocation group size is $2^P$ invocations.

The Applicants have further recognised that where the bitfield index representation is constrained, as discussed above, to a predetermined number of bits, there could be kernels whose index space cannot in fact be represented in full by the predetermined number of bits allowed for the bitfield representation. This will be the case where the kernel has more than $2^N$ invocations, where N is the number of bits allowed for the bitfield index representation. Where this is the case, the kernel's index space is in an embodiment sub-divided or partitioned into two or more sub-sets (partitions) of the index space, for which sub-sets (partitions) the number of invocations can be represented using the predetermined number of bits allowed for the bitfield index representation. Each such index space sub-set (partition) is in an embodiment then treated in the manner of the technology described herein.

Thus, in an embodiment, the technology described herein further comprises partitioning (dividing) the index space specified for a kernel into two or more sub-sets of the index space, and then determining and using bitfield index representations in the manner of the technology described herein for each respective index space sub-set (partition).

In an embodiment a check is made to see if the index space for a kernel needs to be partitioned (and the index space is then partitioned or not, accordingly). In an embodiment this is done by determining the number of bits needed to represent the full index space specified for the kernel and then seeing if this exceeds the predetermined number of bits specified for the bitfield index representation.

It will be appreciated that the extent to which partitioning of the index space of kernels in this manner will be needed will depend on the number of bits allowed for the bitfield index representations, and the typical size of the kernels' index space. The number of bits allowed for the bitfield representations can thus be chosen as a trade-off between the size of the bitfield representations and the amount of index space partitioning that will need to be done. The Applicants have found that using 32 bits for the bitfield index representations provides a suitable balance between the size of the bitfield index representations and the amount of index space partitioning that will need to be done.

Where the index space is partitioned into two or more sub-sets, the partitioning (sub-division) is in an embodiment such that no defined groups of kernel invocations (in OpenCL, work groups) are split between different partitions (i.e. each partition in an embodiment contains entire invocation groups: none of the partitions contains only a part, but not all, of a defined invocation group (a work group)).

The Applicants have further recognised that where the index space for a kernel needs to be partitioned, then for the "higher" partitions, some or all of the index space dimensions for those dimensions may not start at the value one, but will start at higher integer values. In this case, the bitfield index representation may not in itself be able to represent these higher values. In order to allow for this, in an embodiment, a further data structure is prepared for the kernel invocation partition (sub-set) in question, indicating an offset value (or values) to be added to the index value indicated by the bitfield representation for the dimension (or dimensions) in question. This offset is then added to the value indicated for the dimension by the bitfield index representation, to give the actual dimension value to be used for the invocation in question. The dimension offset value or values need be, and are in an embodiment, stored only once for a given index space partition (sub-set), as they can be used in common for all the invocations within the partition in question.

It is also the case that, in OpenCL at least, the index space specified for a kernel can be specified to start at an integer greater than one in any given index dimension or dimensions. In this case, it may again be the case that the bitfield index representation cannot in itself represent the required range of dimension values, but this can be achieved by associating appropriate dimension offsets with the kernel in question, as discussed above.

Thus, in an embodiment, an offset value, to be added to the value indicated by the bitfield index representation, can be (and in an embodiment is) generated and stored for one or more of the index dimensions indicated by the bitfield index representation. In an embodiment a single copy of the offset value(s) is shared and stored for a given index space to be indicated by a given set of bitfield index representations.

Although the technology described herein has been discussed above with particular reference to the processing of a single kernel, as will be appreciated by those skilled in the art, in practice there will be plural kernels to be executed. In such a case, each kernel is in an embodiment processed and treated in the manner of the technology described herein. As will be appreciated by those skilled in the art, each kernel to be executed will have its own bitfield index representation, depending on the configuration of its index dimensions: it is not necessary for each kernel to have the same bitfield index representation, and, indeed, it is likely that different kernels will have different bitfield representations (e.g. in terms of the layout of the fields for each index dimension within the bitfield representation).

Although the technology described herein has been described above with particular reference to OpenCL, as will be appreciated by those skilled in the art, it is equally applicable to other systems that execute multiple invocations of kernels within a multidimensional index space, such as DirectCompute.

Indeed, the Applicants believe that the technology described herein is applicable to the use of multidimensional indices more generally, for example wherever it is required to associate a multidimensional index with some entity, such as a kernel or data structure, to which the index relates.

An example of this would be for the handling of vertex shader indices when processing computer graphics. When a graphics processor is operating in instanced mode, the vertex shader will process a plurality of instances for a given vertex. Each instance of the vertex that is processed will accordingly have both a vertex ID and an instance ID associated with it. These IDs can be handled and packed more efficiently using the techniques of the technology described herein, in the manner discussed above. For example, and in an embodiment, the vertex ID can be considered to be equivalent to a work group ID in OpenCL and the instance ID equivalent to a work item ID in OpenCL.

Thus, according to further embodiments, the technology described herein extends to the use of the techniques of the technology described herein for multidimensional indices more generally.

Thus, a ninth embodiment of the technology described herein comprises a method of representing the indices in a system where entities to be processed can have defined for them a set of plural index dimensions over which separate instances of the entity are to be processed, the method comprising:
  for an entity to be processed having a defined set of index dimensions:
  determining, for each dimension of the entity's index, a maximum number of bits that will be needed to represent that dimension of the entity's index; and
  packing the index for each instance of the entity to be processed into a data structure that is based on the determined maximum number of bits needed to represent each index dimension defined for the entity.

A tenth embodiment of the technology described herein comprises a system for representing the index of an instance of an entity to be processed in a system where entities to be processed can have defined for them a set of plural index dimensions over which separate instances of the entity are to be processed, the system comprising:
  one or more processors configured to, for an entity to be processed having a defined set of index dimensions:
  determine, for each dimension of the entity's index, a maximum number of bits that will be needed to represent that dimension of the entity's index; and
  pack the index for each instance of the entity to be processed into a data structure that is based on the determined maximum number of bits needed to represent each index dimension defined for the entity.

An eleventh embodiment of the technology described herein comprises a method of operating a processing system in which entities to be processed have defined for them a set of plural index dimensions over which separate instances of the entity are to be processed, the method comprising:
  for an entity to be processed having a defined set of index dimensions:
  determining, for each dimension of the entity's index, a maximum number of bits that will be needed to represent that dimension of the entity's index;
  determining a bitfield index representation to be used for indicating the indices for instances of the entity based on the determined maximum number of bits needed to represent each dimension of the entity's index; and
  preparing a bit field placement data structure for the entity, indicating the placement of the bits representing each dimension of the entity's index within the determined bitfield index representation to be used for indicating the indices for instances of the entity.

A twelfth embodiment of the technology described herein comprises an apparatus for use in a system in which entities to be processed can have defined for them a set of plural index dimensions over which separate instances of the entity are to be processed, the apparatus comprising:
  one or more processors configured to, for an entity to be processed having a defined set of index dimensions:
  determine, for each dimension of the entity's index, a maximum number of bits that will be needed to represent that dimension of the entity's index;
  determine a bitfield index representation to be used for indicating the indices for instances of the entity based on the determined maximum number of bits needed to represent each dimension of the entity's index; and
  prepare a bit field placement data structure for the entity, indicating the placement of the bits representing each dimension of the entity's index within the determined bitfield index representation to be used for indicating the indices for instances of the entity.

A thirteenth embodiment of the technology described herein comprises a method of indexing instances of entities that are being processed in a system where an entity to be processed can have defined for it a set of plural index dimensions over which separate instances of the entity are to be processed, the method comprising:
  for an entity to be processed having a defined set of index dimensions:
  reading a bit field placement data structure for the entity, indicating the placement of the bits representing each dimension of the entity's index within a bitfield index representation to be used for indicating the indices for instances of the entity; and
  when an instance of the entity is to be processed, associating with the instance of the entity a bitfield index representation indicating in the respective bit positions indicated by the bit field placement data structure for the entity, a value for the respective index dimension for the instance of the entity, so as to indicate the index for the instance of the entity.

A fourteenth embodiment of the technology described herein comprises a processor for processing instances of entities in a system where an entity to be processed can have defined for it a set of plural index dimensions over which separate instances of the entity are to be processed, the processor configured to:
  read a bit field placement data structure for an entity to be processed having a defined set of index dimensions, the bitfield placement data structure indicating the placement of the bits representing each dimension of the entity's index within a bitfield index representation to be used for indicating the indices for instances of the entity;
  and configured to:
  when an instance of the entity is to be processed, associate with the instance of the entity a bitfield index representation indicating in the respective bit positions indicated by the bit field placement data structure for the entity, a value for the respective index dimension for the instance of the entity, so as to indicate the index for the instance of the entity.

A fifteenth embodiment of the technology described herein comprises a method of processing instances of entities in a system where an entity to be processed has defined for it a set of plural index dimensions over which separate instances of the entity are to be processed, the method comprising:

for an entity to be processed having a defined set of index dimensions:
determining the number of bits needed to represent a maximum value to be indicated for each dimension of the entity's index;
determining a bitfield index representation to be used for indicating the indices for instances of the entity based on the determined number of bits needed to represent the maximum value to be indicated for each dimension of the entity's index;
preparing a bit field placement data structure for the entity, indicating the placement of the bits representing each dimension of the entity's index within the determined bitfield index representation to be used for indicating the indices for instances of the entity;
providing the bitfield placement data structure to a processor or processors that are to process the entity; and
when an instance of the entity is to be processed, associating with the instance of the entity a bitfield index representation configured in accordance with the bitfield placements indicated by the bitfield placement data structure and indicating in the respective bit positions indicated by the bitfield placement data structure for the entity, a value for the respective index dimension for the instance of the entity, so as to indicate the index for the instance of the entity.

A sixteenth embodiment of the technology described herein comprises a system for processing instances of entities to be processed, in which an entity to be processed has defined for it a set of plural index dimensions over which separate instances of the entity are to be processed, the system comprising:

one or more processors configured to, for an entity to be processed having a defined set of index dimensions:
determine the number of bits needed to represent a maximum value to be indicated for each dimension of the entity's index;
determine a bitfield index representation to be used for indicating the indices for instances of the entity based on the determined number of bits needed to represent the maximum value to be indicated for each dimension of the entity's index;
prepare a bit field placement data structure for the entity, indicating the placement of the bits representing each dimension of the entity's index within the determined bitfield index representation to be used for indicating the indices for instances of the entity; and to
provide the bitfield placement data structure to a processor or processors that are to process the entity;
the system further comprising:
one or more processors configured to:
process the entity; and to:
when an instance of the entity is to be processed, associate with the instance of the entity a bitfield index representation configured in accordance with the bitfield placements indicated by the bitfield placement data structure and indicating in the respective bit positions indicated by the bitfield placement data structure for the entity, a value for the respective index dimension for the instance of the entity, so as to indicate the index for the instance of the entity.

As will be appreciated by those skilled in the art, these embodiments of the technology described herein can and in an embodiment do include any one or more or all of the features of the technology described herein described herein, as appropriate.

For example, the multidimensional index in an embodiment represents an OpenCL or DirectCompute kernel invocation, a particular instance of a vertex to be processed in a graphics processing system, a higher order surface control point, a ray to be traced (in a ray-tracing graphics processing system, for example), etc. The entity to be processed accordingly in an embodiment comprises a data structure such as a vertex, a higher order surface control point, a ray to be traced, or a program or routine, such as a kernel, etc.

Similarly, the bitfield index representation in an embodiment comprises a predetermined number of bits, the index space is in an embodiment partitioned into two or more subsets of the index space if required, etc.

Equally, the methods and apparatus in an embodiment further comprise: preparing and storing in a data structure having the configuration indicated by the bitfield placement data structure, an entity index maximum dimension value data structure indicating for each dimension of the entity's index, a maximum value to be used for that dimension for the instances of the entity; and/or, in an embodiment, providing the bitfield placement data structure and/or the entity index maximum value data structure, to a processor or processors that are to process the entity.

In some embodiments the system and/or apparatus comprises, and/or the processor or processors may be in communication with, one or more memories or memory devices that store the bitfield placement data structure for the entity and/or store a bitfield index representation for the or each entity instance being processed and/or store software code for processing the entity and/or store the data described herein and/or store the data structures described herein and/or store software for performing the processes described herein. The system, apparatus, and/or processor or processors may also be in communication with, or comprise a part of, a host CPU and/or a graphics processor for processing the data described herein and/or for performing the processes described herein.

As will be appreciated by those skilled in the art, each kernel invocation (or entity instance index) should be used when executing the kernel invocation (or processing the entity instance) to keep track of the kernel invocation (or entity instance) as it is being executed (processed), and to, e.g., retrieve the data to be processed by the kernel invocation (or for the entity instance) in question and to store the result (the output) of the kernel invocation (or entity instance) appropriately.

Thus, in an embodiment, the method and apparatus and system of the technology described herein further comprise executing (or processor(s) configured to execute and use) one or more and in an embodiment each kernel invocation of the kernel to be executed, and when a kernel invocation is being executed, using the kernel invocation index indicated in the manner of the technology described herein to: identify the kernel invocation in question; identify the data that is to be processed for the kernel invocation in question; and/or to determine where to store the output of the kernel invocation in question.

Similarly, in an embodiment, the method and apparatus and system of the technology described herein further comprise processing (or processor(s) configured to process and use) one or more and in an embodiment each instance of an entity to be processed, and when an instance of the entity is being processed, using the entity instance index indicated in the manner of the technology described herein to: identify the instance of the entity in question; identify the data that is to be processed for the instance of the entity in question; and/or to determine where to store the output of the instance of the entity in question.

The various functions of the technology described herein can be carried out in any desired and suitable manner. For example, the functions of the technology described herein can be implemented in dedicated hardware or programmable hardware, as desired. Thus, for example, the various functional elements and "means" of the technology described herein may comprise a suitable processor or processors, functional units, circuitry, processing logic, microprocessor arrangements, etc., that are operable to perform the various functions, etc., such as appropriately dedicated hardware elements, processors or processing circuitry, and/or programmable hardware elements, processors or processing circuitry that can be programmed to operate in the desired manner.

Similarly, the various index and other values, data structures, etc., can be defined, implemented, and stored in any suitable and desired manner.

It should also be noted here that, as will be appreciated by those skilled in the art, the various functions, etc., of the technology described herein may be duplicated and/or carried out in parallel on a given processor, and/or shared between plural processors (e.g. in a multi-core system).

The technology described herein is applicable to any suitable form or configuration of host processor, graphics processor, compute engine, etc.

The technology described herein extends to a microprocessor system including a graphics processor or processors or a graphics processing platform, that includes the apparatus of, or that is operated in accordance with the method of, any one or more of the embodiments of the technology described herein described herein. Subject to any hardware necessary to carry out the specific functions discussed above, such a system can otherwise include any one or more or all of the usual functional units, etc., that such systems include.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor or microprocessor system comprising a data processor causes in conjunction with said data processor said processor or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

An embodiment of the technology described herein will now be described with reference to the execution of OpenCL kernels on a graphics processor. (However, as discussed above, the technology described herein is not limited to use with OpenCL and graphics processors, but can be used, e.g., wherever compute kernels are to be executed on a given processor.)

Figure 2:
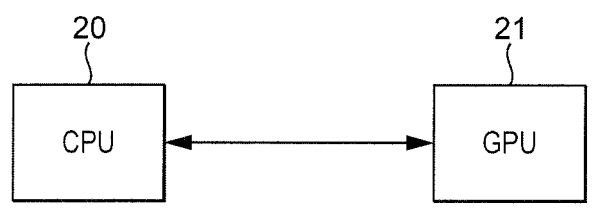
FIG. 2 shows schematically a typical arrangement where an OpenCL kernel may be executed on a graphics processor.

FIG. 2 shows schematically a typical arrangement where an OpenCL kernel may be executed on a graphics processor. As shown in FIG. 2, a host CPU 20 executes an OpenCL API and generates commands for a graphics processor 21 to execute OpenCL kernels. The kernels may, e.g., typically be intended to process an image, for example to filter or compress or encode an image. The kernels may, e.g., provide noise reduction, edge enhancement, format conversion, super-resolution, image analysis (e.g. face or feature recognition), stereoscopic reconstruction, pattern matching, etc.

As is known in the art, the graphics processor will read a command list generated by the OpenCL API on the host CPU 20, and execute the commands in the command list. These commands will include one or more instructions to execute OpenCL kernels. The kernels may, e.g., be intended to perform functions such as compression or filtering of an image.

As is known in the art, and as discussed above, six dimensions will be specified for each OpenCL kernel to be executed on the graphics processor 21, with each dimension being an integer ranging from 1 to the largest possible value for the dimension. This accordingly defines a six-dimensional index space that defines the invocations that are to be executed for the kernel in question. In OpenCL, three of the dimensions represent the work group ID, and the other three dimensions represent the work item ID within the work group for the kernel. For every point in this specified index space, one kernel invocation is started. Each invocation will apply the kernel to, e.g., a particular region of the, e.g., image, that is to be processed.

Thus, when it executes a kernel, the graphics processor 21 will start (and execute) a kernel invocation for each point in the index space specified for the kernel in question.

As discussed above, it is also necessary to associate each invocation with its unique index within the index space. The invocation index is used, e.g., to identify which part of the, e.g., image data, the invocation in question should process, and the output target for the results of the invocation's processing.

In the present embodiment, the index for each kernel invocation is represented in use using a bitfield index representation having a fixed number N, of bits. In the present embodiment each bitfield index representation has 32-bits (i.e. N=32).

Furthermore, the kernel's index space is, if necessary, partitioned into one or more sub-sets of the index space, with each such sub-set (partition) being no larger than the number of indices (points within the index space) that can be represented by the bitfield index representation. Thus, in the present embodiment, each partition (sub-set) of the index space is configured to contain no more than 2^32 points (indices). This has the effect that, inter alia, all the indices within each partition (sub-set) can be represented using a bitfield of 32 bits. (Other values of N would be possible—in general each "partition" should be constrained to contain no more than 2^N points (indices), where N is a positive integer and the maximum number of bits that the bitfield index representation being used can contain.)

Where the index space is partitioned into two or more sub-sets, the partitioning (sub-division) is such that no work groups are split between different partitions.

Where such index space partitioning is required, this is done by the driver on the host processor. The need for index space partitioning is determined by adding up the total number of bits required to represent the maximum value of each index dimension specified for the kernel in question, and seeing whether that is greater than the N-bits (32-bits in the present embodiment) that are allocated to the bitfield index representation.

The index space (where the index space contains less than 2^N points), or each partition (sub-set) of the index space (where the index space contains more than 2^N points), is processed as follows to determine and generate the bitfield index representation that will be used to indicate the index for the invocations of the kernel.

Firstly, the dimensions (the maximum dimension value) of each dimension for the index space partition in question is determined. One is then subtracted from each dimension, and the number of bits needed to represent each index dimension's so-modified maximum dimension value then determined.

This information is then used to determine the size and position of the field to be used to represent each index dimension in the N-bit (32-bit) bitfield index representation that will be used to represent the invocation index for each invocation of the kernel within the index space partition, as follows:

The lowest index dimension is stored in the lowest bits of the bit field representation: bit 0 of this index dimension is stored in bit 0 of the bitfield representation and so on.

For each subsequent index dimension, the position of the highest bit in the bitfield representation that has already been set is determined, and the position of the next index dimension is then started from the next bit onwards.

In this way, the dimensions of the kernel index space partition in question can be packed into an N-bit (32-bit) bitfield.

For example, for an index space partition (sub-set) having six index dimensions, and having sizes for each index dimension as set out below:

|  | Index Dimension: | | | | | |
| --- | --- | --- | --- | --- | --- | --- |
|  | 6 | 5 | 4 | 3 | 2 | 1 |
| Dimension Size: | 1 | 400 | 120 | 1 | 4 | 4 |

1 will be subtracted from each of these values to give a modified set of maximum index dimension values as follows:

|  | Index Dimension: | | | | | |
| --- | --- | --- | --- | --- | --- | --- |
|  | 6 | 5 | 4 | 3 | 2 | 1 |
| Revised Maximum Dimension Value: | 0 | 399 | 119 | 0 | 3 | 3 |

(One is subtracted from the index dimension sizes to allow the full encoding space to be used (as the size value of each index dimension will always be at least one, and so an encoding value of "zero" would never be used).)

The number of bits needed to represent the so-determined maximum dimensional values for each index dimension are then determined, which in this example will require fields containing the following numbers of bits, respectively:

|  | Index Dimension: | | | | | |
| --- | --- | --- | --- | --- | --- | --- |
|  | 6 | 5 | 4 | 3 | 2 | 1 |
| No. of bits needed to represent the revised maximum possible value of the index dimension: | 0 | 9 | 7 | 0 | 2 | 2 |

The bitfield representation to be used for the indices of the kernel invocations is then determined based on these determined numbers of bits needed to represent the maximum value for each index dimension, by packing these bits into the N-bit (in this example a 32-bit) bitfield representation, in the manner discussed above.

Accordingly, for this example, the bitfield positions in the bitfield index representation for indicating the value of each index dimension will be as follows (with the lowest dimension at the right): 20, 11, 4, 4, 2, 0.

Thus the bitfield index representation will be configured as follows:

|                 | bit position of field |   |   |   |   |
|-----------------|-----------------------|---|---|---|---|
|                 | 20                    | 11| 4 | 2 |   |
| Index Dimension | 6                     | 5 | 4 | 2 | 1 |

It should be noted here that in this example, the field for the third index dimension of the index has zero bits (i.e. there is no field included in the bitfield index representation for the third index dimension). This is because its value will always be 1.

Thus, the invocation indices will be represented as a concatenation of six (or fewer) bitfields.

Once the bitfield index representation to be used has been determined, the determined maximum index dimension values for the index space partition (sub-set) in question are stored in this form for future use. This bitfield representation of the maximum index dimension values will be referred to as a "VLLset" (variable length limit set), and will comprise an N-bit (in this embodiment a 32-bit) bitfield representation (having the form of the determined bitfield index representation) of the maximum index dimension values.

For the above example, the VLLset will accordingly be configured as follows:

|                                                                                               | bit position of field |     |     |   |   |
|-----------------------------------------------------------------------------------------------|-----------------------|-----|-----|---|---|
|                                                                                               | 20                    | 11  | 4   | 2 |   |
| Index Dimension                                                                               | 6                     | 5   | 4   | 2 | 1 |
| VLLset index dimension value indicated by bits in the field for the index dimension           | 0                     | 399 | 119 | 3 | 3 |

An exemplary procedure for constructing the bitfield index representation and the VLLset can be represented in C++ code as follows:

```
// find-highest-set-bit function; returns 0 if no bit is set,
or else the index of the highest bit set
using 1-based counting (e.g. if the very top bit is set, return 32)
int fhs( uint32_t input )
  {
  int p = 0;
  while( input != 0) { p++; input >>= 1; }
  return p;
  }
// construct the actual VLLset
uint32_t produce_vllset( const int dimensions[6], int placements[7] )
  {
  uint32_t vllset = 0;
  for(int i=0;i<6;i++)
    {
    cutoffs[i] = fhs(vllset);
    vllset |= (dimensions[i]-1) << placements[i];
    }
  placement[6] = 32;
  return vllset;
  }
```

As well as generating the VLLset for the index space partition (sub-set), the positions (bitfield placements) for the fields for each index dimension of the sub-set of the index space in the N-bit (32-bit) bitfield index representation are also recorded in a bitfield placement data structure for future use.

For the example given above, this bitfield placement information (data structure) will indicate that dimension 1 occupies bits 0-1 in the 32-bit bitfield, dimension 2 occupies bits 2-3 in the bitfield, dimension 3 occupies 0 bits in the bitfield, dimension 4 occupies bits 4-10 in the bitfield, dimension 5 occupies bits 11-19 in the bitfield, and dimension 6 occupies bits 20-31 in the bitfield (or, looked at another way, bits 0-1 contain the value of dimension 1, bits 2-3 contain the value of dimension 2, bits 4-10 contain the value of dimension 4, bits 11-19 contain the value of dimension 5, and bits 20-31 contain the value of dimension 6).

The bitfield placement data structure may, e.g., indicate (encode) the start bit location for each index dimension's bitfield (save the first, which will always start at the "0" bit and so does not need explicitly indicating). Other arrangements, such as indicating the actual number of bits that have been used for each index dimension, could be used if desired.

The VLLset and the bitfield placement data structure together form the parameters that are specified for each partition (sub-set) that the kernel invocation index space is divided into.

The determination of the bitfield index representation to use and the bitfield placement data structure and the VLLset is in an embodiment carried out by the compiler on the host processor that compiles the kernel or kernels for processing. However, it could be done in other ways, for example in hardware or in any other way.

Once the VLLset and bitfield placement information for the index space partition have been generated and stored, the kernel invocations for the index space partition can be executed. To do this, the graphics processor 21 iterates over all the dimensions specified in the VLLset, producing and executing a kernel invocation for each point within the index space defined by the VLLset.

The set of kernel invocations produced when iterating over the index space defined by the VLLset is equivalent to the set kernel invocations that would be produced by the following C++ code:

```
// function to extract a bitfield between two bit positions
uint32_t xbf( uint32_t inp, int lowbit, int highbit )
  {
  inp &= (1 << highbit) - 1;
  return inp >> lowbit
  }
void start_kernel_invocations( uint32_t vllset, int placements[7])
  {
  for(int i=0; i <= xbf( vllset, placements[5], placements[6]); i++)
    for(int j=0; j <= xbf( vllset, placements[4], placements[5]); j++)
      for(int k=0; k <= xbf( vllset, placements[3], placements[4]); k++)
        for(int l=0; l <= xbf( vllset, placements[2], placements[3]); l++)
          for(int m=0; m <= xbf( vllset, placements[1],
            placements[2]); m++)
            for(int n=0; n <= xbf( vllset, placements[0],
              placements[1]); n++)
              start_kernel_invocation_with_ID(n,m,l,k,j,i);
  }
```

The above process, using the VLLset, produces the kernel invocations to be executed for the partition (sub-set) of the index space that the partition in question relates to.

As discussed above, it is also necessary to associate each invocation with its corresponding index and to track that index as the invocation executes.

In the present embodiment, and in accordance with the technology described herein, the six-dimensional index for a given kernel invocation is not directly represented in an unpacked from. Instead, the invocation's index is packed into the N-bit (in the present embodiment 32-bit, as discussed above) bitfield index representation determined as discussed above (i.e. a bitfield representation containing the number of fields determined for the bitfield index representation for the kernel index space partition, with each field having a size matching the field of the bitfield index representation to be used for the partition (index space sub-set) in question, and indicating the value of the index dimension that that field represents for the kernel invocation in question). The bitfield index representation of a kernel invocation's index will be referred to as a "VLIset" (variable length index set).

Thus, an invocation index within the above index partition (1, 400, 120, 1, 4, 4), such as (1, 232, 66, 1, 2, 3), for example, will be stored as a 32-bit VLIset bitfield index representation as follows:

|  | bit position of field | | | | |
| --- | --- | --- | --- | --- | --- |
|  | 20 | 11 | 4 | 2 |  |
| Index Dimension | 6 | 5 | 4 | 2 | 1 |
| VLI set index dimension value indicated by bits in the field for the index dimension | 1 | 232 | 66 | 2 | 3 |

In this way, the index for each kernel invocation within the partition (index space sub-set) in question is represented as an N-bit bitfield index representation (a 32-bit bitfield representation in the present embodiment). This is then a saving on the storage space required to represent the invocation's six-dimensional index in its full, unpacked form.

An exemplary procedure for constructing the VLIset for a given kernel invocation can be represented in C++ code as follows:

```
uint32_t vliset_from_invocation_ID( int id[6], int placements[7] )
{
  uint32_t vliset = 0;
  for(int i = 0; i<6; i++)
    vliset[i] |= id[i] << placements[i];
  return vliset[i];
}
```

Once the VLIset has been generated for and associated with the kernel invocation, the kernel invocation can be executed. The VLIset will be consulted whenever the index for the invocation is required. When the index is needed, the VLIset will be read and unpacked, and then interpreted in accordance with the information indicated in the bitfield placement data structure (i.e. indicating which bits within the VLIset indicate the values of which index dimensions).

Although representing the index for a given kernel invocation in a packed form, as the VLIset bitfield index representation, in itself provides a saving in terms of the storage space required for the kernel invocation's index, in the present embodiment further steps are taken so as to represent each kernel invocation's index even more efficiently.

In OpenCL, kernel invocations are usually grouped by work-group, with the lower 3 dimensions of the invocation index being used to specify the space of work-items within a workgroup, and the upper 3 dimensions of the invocation index being used to define a space of workgroups. The Applicants have recognised that where, as will typically be the case, in a given implementation, the maximum workgroup size is set to $2^P$ invocations, then if a VLIset is assigned to each of these invocations, the VLIsets of the different invocations can only differ in the bottom P+2 bits of each VLIset. (This is essentially because given the limit on the number of work items in a work group, there will be a determinable maximum index space that can ever be required to represent the indices needed for that number of work items.)

In the present embodiment, the maximum workgroup size is 1024 invocations (i.e. $2^{10}$). This means that the VLIsets denoting the indices of the different kernel invocations within a given work group within a given index space partition can differ only in the low 12 bits of each VLIset. In other words, the top 20 bits of each VLIset for the kernel invocations within the same work group will be the same.

The present embodiment exploits this recognition, by being configured to supply only the bottom 12 bits of each VLIset as information that is given on a per-invocation basis. The remaining 20 bits of each VLIset are instead associated with the respective work group, and thus only supplied and stored on a per-workgroup basis. Since the number of active workgroups is usually much smaller than the active invocations at any given time, this can provide a fairly major storage space saving.

Then, when an attempt is made to read the index of a kernel invocation, the 20 bits that are stored for the invocation's workgroup are concatenated together with the 12 bits that are supplied for (associated with) the individual invocation, to generate the VLIset for the invocation. The invocation's index is then retrieved by unpacking the fields of the VLIset, in accordance with the bitfield placement information indicated by the bitfield placement data structure.

In order to handle the cases where one set of bitfield index representations cannot represent a full kernel execution (e.g. because the full kernel execution involves more than $2^N$ invocations (i.e. more than the $2^N$ invocations that one N-bit bitfield index representation can represent)), a kernel parameter is prepared for each partition (sub-set) that the kernel's invocation space is divided into, that specifies the starting position (the offset) of the partition within the kernel execution's index space.

For example, if, following the above example, as well as the partition for the index space:

|  | Index Dimension: | | | | | |
| --- | --- | --- | --- | --- | --- | --- |
|  | 6 | 5 | 4 | 3 | 2 | 1 |
| Dimension Range | 0→1 | 0→400 | 0→120 | 0→1 | 0→4 | 0→4 | discussed above, there was a further partition for the index space having the following index dimension value ranges:

|  | Index Dimension: | | | | | |
| --- | --- | --- | --- | --- | --- | --- |
|  | 6 | 5 | 4 | 3 | 2 | 1 |
| Dimension Range | 0→1 | 401→600 | 0→120 | 0→1 | 0→4 | 0→4 | a set of offsets will be determined and stored for (associated with) the index space partition (sub-sets) in question, representing the starting point value for each index dimension within this partition. In this example, these offset values would be as follows:

|  | Index Dimension: | | | | | |
| --- | --- | --- | --- | --- | --- | --- |
|  | 6 | 5 | 4 | 3 | 2 | 1 |
| Dimension offset value | 0 | 401 | 0 | 0 | 0 | 0 | thus indicating that the value for index dimension 5 in this partition in fact starts at 401.

This then allows for the fact that a single N-bit (a 2^N) bitfield representation may not be able in itself to represent the true values of the index dimensions.

When the kernel attempts to read any part of or the whole global invocation ID, this kernel offset parameter is then added to the parameters that are retrieved from the invocation's VLIset. (If there is direct support for offsets, this may be done by adding the values before returning them to the kernel invocation, or it could be implemented in software, e.g. by including the appropriate functions at compile time.)

(The offset parameters may be provided by the application to the API, which can then, e.g., either store them in dedicated data structures, or bake them in when compiling the kernel code (thus not requiring any hardware support), since they are static. The baking could use, e.g., runtime changeable values in memory for the values, or embedded constants in the kernel binary itself.)

In the case of the lowest partition, which should not require any offsets, or where only a single partition is needed (i.e. the kernel does not require more than 2^N invocations), then the use of the partition offset parameters could simply be eliminated, or, alternatively (e.g. if the system is configured to generate and use an offset parameter regardless of whether it is actually needed or not), an offset parameter simply set to zero offset for each index dimension could be used.

Such an offset parameter may also be used, for example, where the index space specified for a kernel does not start at the origin, but is set to start at some other point. This can be the case with OpenCL, as OpenCL allows the index space for a given kernel to start at positions other than the origin.

It can be seen that in this embodiment, the total cost of supplying the full 126 bits of the OpenCL invocation index for a given kernel invocation can be reduced to:
12 bits per invocation,
20 bits per workgroup, and
96 bits for a kernel parameter that is supplied once per index space partition (sub-set).

This is therefore a significant saving in terms of the cost of supplying the invocation indices.

The use of the present embodiment when executing a parallel image filter processing algorithm that takes as its input one high dynamic range image and produces as its output three different enhanced low dynamic range output images will now be described to further illustrate the operation of the present embodiment.

In this example, the image filtering algorithm is implemented by means of an OpenCL kernel. Thus, the image filtering job will be issued by the application that requires it to, e.g., an OpenCL implementation (that is, e.g., running on a host CPU 20) for processing. At this stage the job issued by the application will basically consist of the input image data, the kernel that implements the filtering algorithm, the size of the six kernel dimensions and information about location to put the output data.

The OpenCL implementation will then compute the VLLset and bit field placement information (as discussed above), e.g. by its driver software.

In this example, it is assumed that the resolution of the input and output images are the same, with the input image resolution being 1920×1080 and the resolution of each output image accordingly also being 1920×1080, and that the image filtering algorithm is implemented in an OpenCL kernel that is to be executed once for every output pixel, i.e each output pixel is a work item.

The work items (pixels to be processed) are accordingly grouped into work groups of dimension 8×8×3 work items, such that each group of work items covers (and corresponds to) an 8×8 2D area of each output image, and groups each of the 3 output images at that location together (to thereby benefit from better cache utilization due to the fact that the three output images will use the same input data).

The three 1920×1080 output images thus become a set of 240×135=32400 work groups, each of 8×8×3=192 work items.

Mapping this to the global work item ID's six dimensions in the manner of the present embodiment gives:

|  | Work Group ID | | | Local ID | | |
| --- | --- | --- | --- | --- | --- | --- |
|  | Index Sub-dimension label | | | | | |
|  | WZ | WY | WX | LZ | LY | LX |
| Dimension size | 1 | 135 | 240 | 3 | 8 | 8 |
| Max dimension value | 0 | 134 | 239 | 2 | 7 | 7 |
| Bits needed to encode max value | 0 | 8 | 8 | 2 | 3 | 3 |

The bitfield index representation to be used for the indices of the kernel invocations is then determined based on the determined number of bits needed to represent the maximum value that will be needed for each index dimension. In this case, assuming a 32-bit bitfield representation, the index dimension fields will be arranged in the bitfield representation as follows:

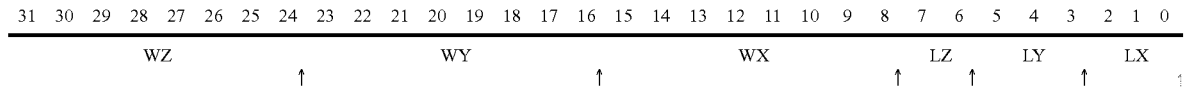

(The arrows show the start bit position for each of the index fields.)

It should be noted here that although in this case the Work Group ID's Z dimension (WZ) could have used zero bits in the bitfield index representation as its dimension is 1 and maximum value is always 0, since there is no need to save any further bits in the fixed 32-bit bitfield index representation word, there is no end termination and WZ is encoded in the remaining bits.

A bitfield placement data structure (information) describing how the bitfield index representation is partitioned is then prepared. In the present embodiment, this data structure encodes the start bit location for each index field except the first which is implicitly 0. As in this case each bitfield index representation is a 32-bit word, each start value field in the bitfield placement data structure is set to 6-bits so as to be able to encode both '0' and '32'.

| 31 30 29 28 27 26 | 25 24 23 22 21 20 | 19 18 17 16 15 14 | 13 12 11 10 9 8 | 7 6 5 4 3 2 1 0 |
|---|---|---|---|---|
| StartWZ 24 | Start WY 16 | Start WX 8 | Start LZ 6 | Start LY 3 |

It should be noted here that by applying further restrictions on the size of the different index dimensions these fields could be adjusted correspondingly. For example, for an implementation that has a maximum of 256 work items per work group, the maximum number of bits needed to encode each dimension of the local three dimensional work item ID would be 10. In this case, each of the local work item dimensions LX/LY/LZ would require only 4 instead of 6 bits to encode their start bit location (although it might still be in an embodiment to leave room to be able to increase the work group size limit later without then having to change the visible encoding structure as well).

Instead of start bit information, the values encoded in the bitfield placement data structure could, e.g., be the number of bits needed per index dimension. This would require in the worst case 5 bits for each for the 6 dimensions, but would require a recursive decoder (which would be workable for single point decoding at least, but might be less desirable for distributed decoding).

As well as the bitfield placement data structure, the driver also generates a maximum value data structure (the VLLset) having the form of the bitfield index representation and encoding in the bitfields of the bitfield index representation the maximum index dimension values to be used for the kernel. Thus, in the present example, the VLLset encodes the following index values:

| | Work Group ID | | | Local ID | | |
|---|---|---|---|---|---|---|
| | Index Sub-dimension label | | | | | |
| | WZ | WY | WX | LZ | LY | LX |
| Max dimension value | 0 | 134 | 239 | 2 | 7 | 7 |

Once the bitfield placement data structure and VLLset have been prepared, they are sent, together with the kernel to the GPU hardware 21 for processing. This is done by storing them in memory data structures, but other arrangements such as using dedicated command buffers, etc., would be possible, if desired.

Figure 3:
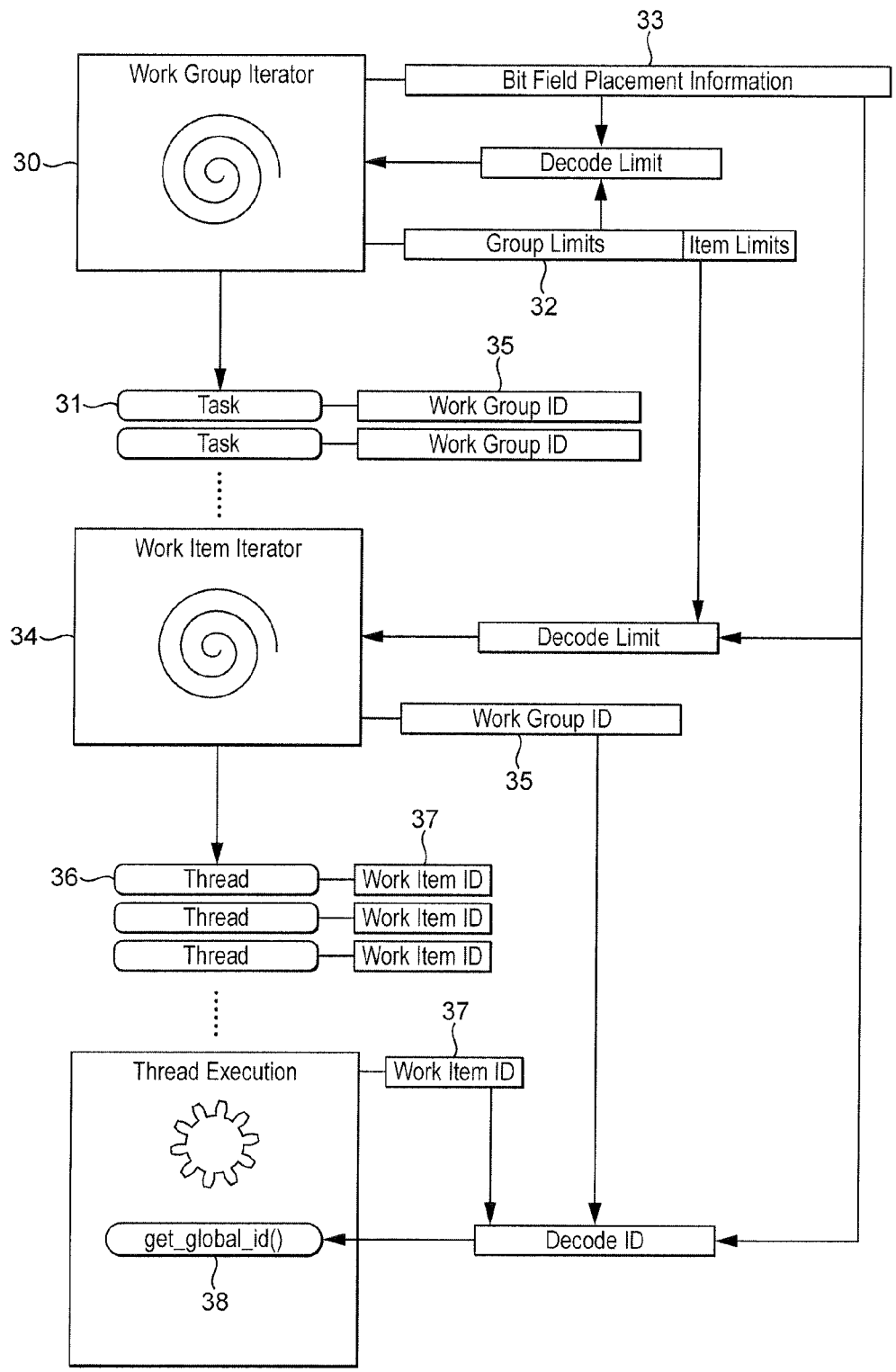
FIG. 3 shows schematically the operation of a graphics processor when executing kernel invocations across an index space in an embodiment of the technology described herein.

The GPU 21 then executes the kernel invocations across the index space indicated by the VLLset. This process is illustrated in FIG. 3, which shows schematically the operation of the GPU 21 to iterate across the indicated index space.

In this embodiment, the GPU hardware has a work group iteration unit 30 that traverses through the three highest dimensions of the kernel index space, issuing work group tasks 31 to available compute units of the GPU (of which there may be many). To do this, the work group iteration unit 30 uses the VLLset 32 and bit field placement information 33 to extract the three integers that describe the index dimensions of the work group set. The traversal order can be arbitrary but in this embodiment the iteration is done linearly through the WX dimension, i.e. line by line of the work group set.

When a compute unit receives a work group task 31 identified by its three dimensional Work Group ID 35, it uses a work item iterator 34 to spawn threads (kernel invocations) 36 for execution by traversing over the three lowest index dimensions, spawning one thread (invocation) for each work item. The work item iterator 34 again uses the VLLset 32 and bit field placement information 33 to extract the three integers that describes the index dimensions of the local work item set. Again the traversal order can be arbitrary but in this example the iteration is done linearly through the LX dimension i.e. line by line of each output sub-image.

As discussed above, when the maximum number of work items in a work group is 256, it is known that the maximum number of bits needed to encode the local work item ID 37 is 10, which leaves 22 bits for the work group ID 35 (when the upper limit for the complete global work item ID is 32 bits). This is exploited by each compute unit as follows: while a work group is executing on the compute unit, it uses the 22 bits of packed work group ID 35 and the full bit field placement information 33 as a shared state between all the work items, but gives the 10 bits of packed individual local work item ID 37 to each corresponding work item as a private state.

Each spawned thread 36 then starts to execute the kernel of the job and looks up its global ID 38 consisting of the complete six index dimensions. The hardware combines the shared work group ID 35 with the private local work item ID 37 and uses the bit field placement information 33 to decode the complete set of 6 integers that identify the work item in the index space and returns it to the thread (kernel invocation) 36.

With the knowledge of its ID, the thread 36 can then load and process the correct data from the input image (execute the image filtering algorithm in this case) and store the output value to the correct location in the output image. The input and output images may, e.g., be stored in suitable memory that is accessible to or by the GPU 21.

This will be repeated until all the work items (kernel invocations) have been executed, at which point the output images will be complete and available for use, e.g. for display and/or analysis.

Although the present embodiment has been described above with reference to processing a given kernel, it will be appreciated that the technique of the technology described herein can be and in an embodiment is used for each and every kernel that is to be executed. Thus there will, typically, be a series of kernels to be executed, and each kernel will be processed in the manner of the present embodiment.

Similarly, although the present embodiment has been described above with particular reference to OpenCL kernels and to the use of a 6-dimensional index space, as will be appreciated by those skilled in the art, the technology described herein is equally applicable to other multi-dimensional indexing arrangements. Thus, for example, it may equally be applied to other kernel invocation processes, such as DirectCompute, or, indeed, to other situations where multi-dimensional indexes are required to be associated with threads, etc., to be processed or executed, such as can be the case for vertex shading in graphics processors.

Equally, the structure of the bitfield index representation can be varied as desired. For example, the number of fields required for the bitfield index representation will be determined by how many dimensions the index has (and actually needs for any given set of indices).

It can be seen from the above that the technology described herein, in its embodiments at least, provides a more efficient mechanism for storing and using multi-dimensional indices. This has advantages in terms of the cost of supplying and using the indices.

This is achieved in the embodiments of the technology described herein at least by assessing the range of indices that are required and determining a more compact bitfield representation for the indices, which representation is then used for the indices.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of processing kernel invocations in a system where a kernel to be executed has defined for it a set of plural index dimensions over which separate invocations of the kernel are to be executed, the method comprising:
   for a kernel to be executed having a defined set of index dimensions:
   determining by one or more processors of the system the number of bits needed to represent a maximum value to be indicated for each dimension of the kernel's index;
   determining by the one or more processors of the system a bitfield index representation to be used for indicating the indices for invocations of the kernel based on the determined number of bits needed to represent the maximum value to be indicated for each dimension of the kernel's index;
   preparing by the one or more processors of the system a bit field placement data structure for the kernel, indicating the placement of the bits representing each dimension of the kernel's index within the determined bitfield index representation to be used for indicating the indices for invocations of the kernel;
   providing by the one or more processors of the system the bitfield placement data structure to a processor or processors that are to execute the kernel; and
   when a kernel invocation is to be executed, associating with the kernel invocation a bitfield index representation configured in accordance with the bitfield placements indicated by the bitfield placement data structure and indicating in the respective bit positions indicated by the bitfield placement data structure, a value for the respective index dimension for the kernel invocation, so as to indicate a kernel invocation index for the kernel invocation.

2. The method of claim 1, further comprising:
   if an index dimension for the kernel has a single, constant value, not allocating any bits in the bitfield index representation to that index dimension.

3. The method of claim 1, further comprising:
   using a predetermined number of bits for the bitfield index representation for the kernel, irrespective of the actual size of the index space for the kernel.

4. The method of claim 1, further comprising:
   preparing and storing in a data structure having the configuration indicated by the bitfield placement data structure, a kernel index maximum dimension value data structure indicating for each dimension of the kernel's index, a maximum value to be used for that dimension for the invocations of the kernel.

5. The method of claim 1, further comprising:
   dividing the index space specified for a kernel into two or more sub-sets, and then determining and using bitfield index representations using the method of claim 1 for each respective index space sub-set.

6. The method of claim 1, further comprising:
   generating an offset value that is to be added to the value indicated by the bitfield index representation for one or more of the index dimensions indicated by the bitfield index representation.

7. A system for processing kernel invocations, in which a kernel to be executed has defined for it a set of plural index dimensions over which separate invocations of the kernel are to be executed, the system comprising:
   one or more processors configured to, for a kernel to be executed having a defined set of index dimensions:
   determine by the one or more processors the number of bits needed to represent a maximum value to be indicated for each dimension of the kernel's index;
   determine by the one or more processors a bitfield index representation to be used for indicating the indices for invocations of the kernel based on the determined number of bits needed to represent the maximum value to be indicated for each dimension of the kernel's index;
   prepare by the one or more processors a bit field placement data structure for the kernel, indicating the placement of the bits representing each dimension of the kernel's index within the determined bitfield index representation to be used for indicating the indices for invocations of the kernel; and to
   provide by the one or more processors the bitfield placement data structure to a processor or processors that are to execute the kernel;
   the system further comprising:
   one or more processors configured to:
   execute the kernel; and to:
   when a kernel invocation is to be executed, associate with the kernel invocation a bitfield index representation configured in accordance with the bitfield placements indicated by the bitfield placement data structure and indicating in the respective bit positions indicated by the bitfield placement data structure, a value for the respective index dimension for the kernel invocation, so as to indicate a kernel invocation index for the kernel invocation.

8. The system of claim 7, wherein one or more of the processors are further configured to:
   if an index dimension for a kernel has a single, constant value, not allocate any bits in the bitfield index representation to that index dimension.

9. The system of claim 7, wherein one or more of the processors are further configured to:
   use a predetermined number of bits for the bitfield index representation for each kernel, irrespective of the actual size of the index space for the kernel.

10. The system of claim 7, wherein one or more of the processors are further configured to:
    prepare and store in a data structure having the configuration indicated by the bitfield placement data structure, a kernel index maximum dimension value data structure indicating for each dimension of a kernel's index, a maximum value to be used for that dimension for the invocations of the kernel.

11. The system of claim 7, wherein one or more of the processors are further configured to:
    divide the index space specified for a kernel into two or more sub-sets, and then determine and use respective bitfield index representations for each respective index space sub-set.

12. The system of claim 7, wherein one or more of the processors are further configured to:
    generate an offset value that is to be added to the value indicated by the bitfield index representation for one or more of the index dimensions indicated by the bitfield index representation.

13. The system of claim 7, wherein one or more of the processors are further configured to:
    when a kernel invocation is to be executed, and no bits in the bitfield index representation are allocated to an index dimension, allocate a value of one to that index dimension when interpreting the bitfield index representation to derive the invocation's index.

14. The system of claim 7, wherein one or more of the processors are further configured to:
    divide the bitfield index representation for each kernel invocation into two parts, a first part that is specific to the kernel invocation in question, and a second part that is shared by a group of kernel invocations.

15. A non-transitory computer readable storage medium storing computer software code which when executing on one or more processors performs a method of operating a processing system in which kernels to be executed have defined for them a set of plural index dimensions over which separate invocations of the kernel are to be executed, the method comprising:
    for a kernel to be executed having a defined set of index dimensions:
    causing the one or more processors to determine, for each dimension of the kernel's index, a maximum number of bits that will be needed to represent that dimension of the kernel's index;
    causing the one or more processors to determine a bitfield index representation to be used for indicating the indices for invocations of the kernel based on the determined maximum number of bits needed to represent each dimension of the kernel's index;
    causing the one or more processors to prepare a bit field placement data structure for the kernel, indicating the placement of the bits representing each dimension of the kernel's index within the determined bitfield index representation to be used for indicating the indices for invocations of the kernel;
    causing the one or more processors to provide the bitfield placement data structure to a processor or processors that are to execute the kernel; and
    when a kernel invocation is to be executed, associating with the kernel invocation a bitfield index representation configured in accordance with the bitfield placements indicated by the bitfield placement data structure and indicating in the respective bit positions indicated by the bitfield placement data structure, a value for the respective index dimension for the kernel invocation, so as to indicate a kernel invocation index for the kernel invocation.

* * * * *